United States Patent [19]

Kawasaki et al.

[11] Patent Number: 5,170,203
[45] Date of Patent: Dec. 8, 1992

[54] CAMERA SYSTEM

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 736,747

[22] Filed: Jul. 26, 1991

[30] Foreign Application Priority Data

Nov. 9, 1990 [JP] Japan .................................. 2-305777

[51] Int. Cl.$^5$ ............................................. G03B 13/36
[52] U.S. Cl. ..................................................... 354/402
[58] Field of Search ............... 354/400, 402, 403, 404, 354/405, 406, 407, 408, 409

[56] References Cited

U.S. PATENT DOCUMENTS

| 4,477,164 | 10/1984 | Nakai et al. | 354/286 |
| 4,509,842 | 4/1985 | Taniguchi et al. | 354/402 |
| 4,560,267 | 12/1985 | Nakai et al. | 354/412 |
| 4,602,861 | 7/1986 | Taniguchi et al. | 354/403 |
| 4,673,275 | 6/1987 | Nakai et al. | 354/412 |
| 5,036,349 | 7/1991 | Suzuki et al. | 354/402 |

Primary Examiner—W. B. Perkey
Attorney, Agent, or Firm—Sandler, Greenblum & Bernstein

[57] ABSTRACT

A camera system is provided which includes a camera body having a body microcomputer and an interchangeable photographing lens having a lens microcomputer that is connected to the body microcomputer to effect data communication therebetween. The body microcomputer includes an AF controller for performing auto focus control, and an F-number transmitting device for transmitting a permission F-number set in the camera body to the lens microcomputer so as to effect the auto focus control in accordance with the AF controller. The lens microcomputer includes an arithmetic operation device for calculating an open F-number at an optional focal length, a comparator for comparing the permission F-number transmitted by the F-number transmitting device with the open F-number calculated by the arithmetic operation device, and a judgment data setting device for setting AF judgment data which determines the permission of the auto focus control in accordance with the detection result of the comparator.

11 Claims, 5 Drawing Sheets

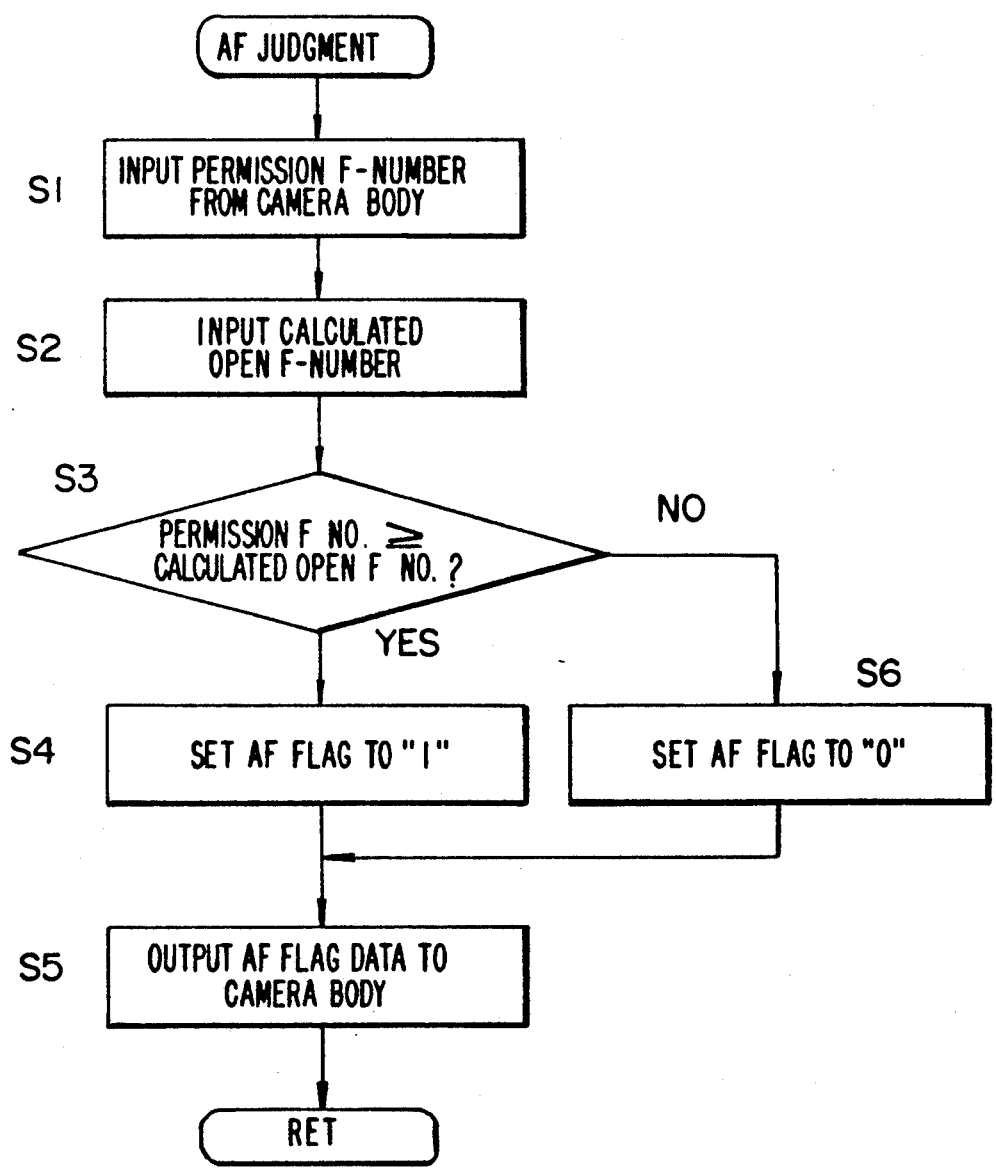

CAMERA SYSTEM

BACKGROUND OF THE INVENTION

1. Field of the Invention

The present invention relates to a camera system having a data communication function between a camera body and a photographing lens.

2. Description of Related Art

In a known single lens reflex camera having an automatic focusing device, data, such as, for example an open F-number peculiar to the photographing lens used for an automatic exposure function, or an automatic focus function is sent as electrical signals to a CPU provided in the camera body from the photographing lens.

To this end, the photographing lens used in the single lens reflex camera includes a lens ROM in which data peculiar to the photographing lens is stored. A plurality of electrical contacts are provided on the lens mount of a photographing lens and the body mount of a camera body to transmit and receive the data therebetween.

The CPU of the camera body performs the data communication with the lens ROM through the electrical contacts to read the data stored in the lens ROM. Necessary data is outputted from the lens ROM in accordance with address signals which are sent thereto from the CPU synchronously with clock pulses output from the camera body.

However, in a single lens reflex camera in which an AF (auto focus) motor and a PZ (power zoom) motor are provided in the photographing lens, if the control of the AF and PZ motors is effected by the CPU of the camera body, the CPU receives an over-load. In particular, the operation of a single lens reflex camera in which a variety of photographing lenses can be exchangeably mounted to the same camera body is quite slow, due to the fact that the CPU of the camera body must read different parameters depending on the photographing lenses from the lens ROM to perform predetermined arithmetic operation to thereby control the photographing lenses.

Various kinds of data for the different types of photographing lenses which can be attached to the camera body, such as judgment data which determines whether the photographing lens attached to the camera body is the type in which an auto focus control is possible, etc., are stored in the lens ROM. Therefore, a large part of the memory (capacity) of the lens ROM is used for that data, so that it is either necessary to erase data in order to rewrite new data or it is necessary to replace the existing ROM with a larger ROM, which is troublesome.

SUMMARY OF THE INVENTION

The primary object of the present invention is to provide a camera system in which a load on the camera body side can be reduced.

To achieve the object mentioned above, according to one aspect of the present invention, there is provided a camera system including a camera body having a body microcomputer, and an interchangeable photographing lens having a lens microcomputer which is connected to the body microcomputer to effect data communication therebetween. The body microcomputer comprises an AF control means for performing an auto focus control, and an F-number transmitting means, set in the camera body, which transmits a permission F-number to the lens microcomputer so as to effect the auto focus control in accordance with the AF control means. The lens microcomputer comprises an arithmetic operation means for calculating an open F-number at an optional focal length, means for comparing the permission F-number transmitted by the F-number transmitting means with the open F-number calculated by the arithmetic operation means, and a judgment data setting means for setting an AF judgment data which determines the permission of the auto focus control.

In this arrangement, the load on the microcomputer of the camera body can be reduced. Furthermore, since the judgment data can be set in accordance with the result of the detection of the comparison, it is not necessary to always store the judgment data in the ROM. Therefore, the memory area of the ROM can be effectively used.

The AF judgment data set by the judgment data setting means can be made as a flag data which is set to "1" when the auto focusing can be effected and to "0" when the auto focusing cannot be effected, in accordance with the detection result of the comparing means.

If the lens microcomputer has a judgment data transmitting means for transmitting the AF judgment data to the body microcomputer, and the body microcomputer has a control prohibition means for prohibiting the auto focus control by the AF control means in accordance with the AF judgment data transmitted by the judgment data transmitting means, then the auto focus control can be quickly prohibited in response to the AF judgment data.

According to another aspect of the present invention, there is provided a camera system including a camera body having a body microcomputer, and an interchangeable photographing lens having a lens microcomputer which is connected to the body microcomputer to effect a data communication therebetween, wherein the body microcomputer comprises an AF control means for performing an auto focus control, and an F-number transmitting means which transmits a permission F-number set in the camera body to the lens microcomputer so as to effect the auto focus control in accordance with the AF control means. The lens microcomputer comprises an arithmetic operation means for calculating an open F-number at an optional focal length, a comparing means for comparing the permission F-number transmitted by the F-number transmitting means with the open F-number calculated by the arithmetic operation means, a judgment data setting means for setting an AF judgment data which determines the permission of the auto focus control, and a judgment transmitting means for transmitting the AF judgment data set by the judgment data setting means to the body microcomputer.

In this arrangement, the load on the microcomputer of the camera body can be reduced. Further, as it is not necessary to always store the judgment data in the ROM, the memory area of the ROM can be effectively used. Moreover, the auto focus control, for instance, can be firmly prohibited by transmitting the AF judgment data set by the judgment data setting means to the body microcomputer.

The present disclosure relates to the subject matter contained in Japanese Patent Application No. HEI 2-305777 (filed on Nov. 9, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
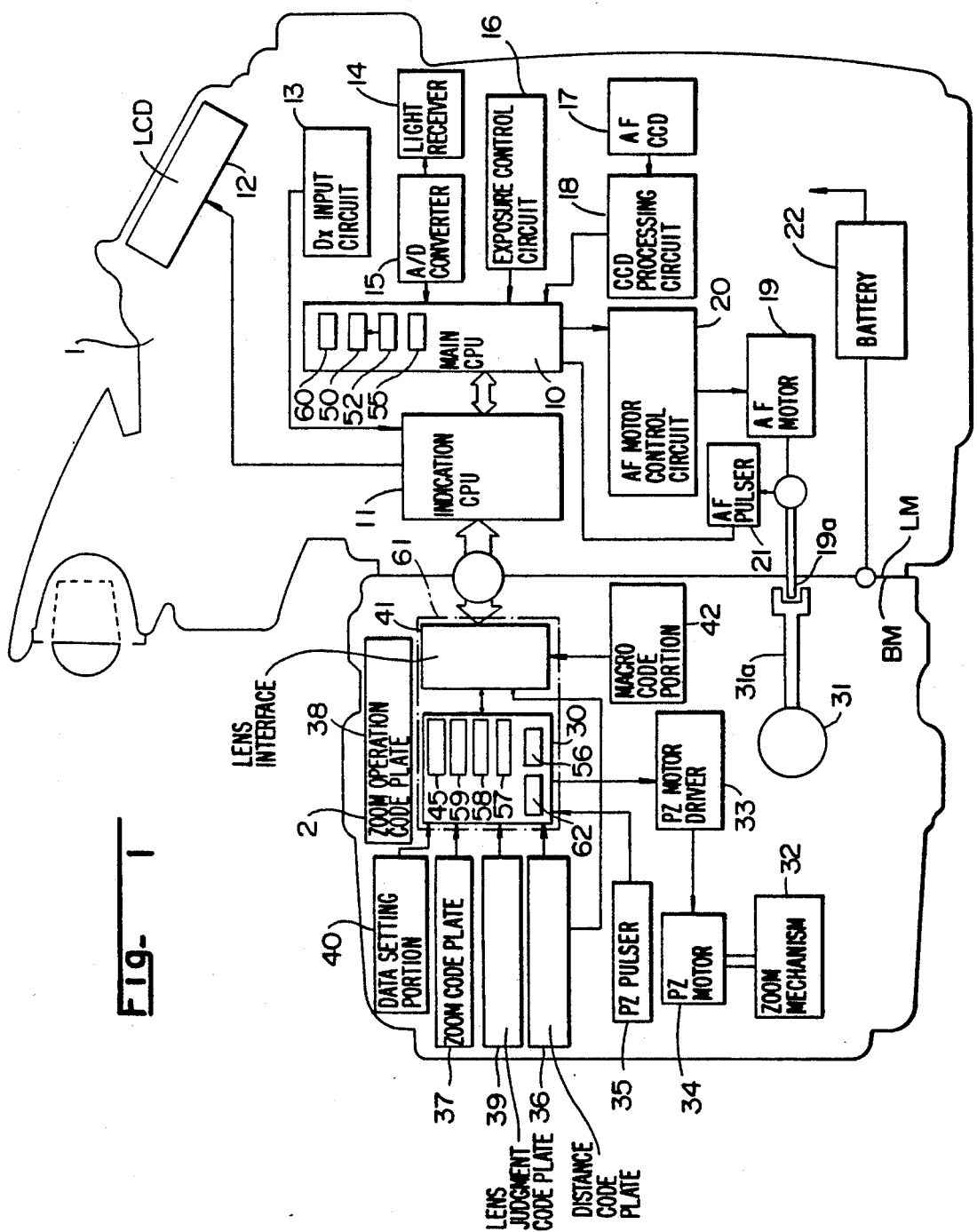
FIG. 1 is a block diagram of a single lens reflex camera to which a camera system according to the present invention is applied.

FIG. 1 shows a single lens reflex camera having a camera system according to an aspect of the present invention.

Camera body 1 has a main CPU 10 and an indication CPU 11. The main CPU 10 generally controls the whole camera system and performs arithmetic operations of various data necessary for taking a picture. The indication CPU 11 functions not only as an interface (data communication) to input data by switch members and to transmit and receive data (i.e., signals) to and from a photographing lens (zoom lens) 2, but also as a controller to control the indication of the photographing data.

The indication CPU 11 is connected to an LCD panel 12 which indicates photographing data, and a DX code input circuit 13 which selectively reads at least ISO sensitivity data of a film from DX codes provided on a surface of a patrone of the film.

A light receiver 14, which receives light incident thereon through the photographing lens 2 to output analog signals in accordance with the amount of light received, is connected to the main CPU 10, through an A/D converter 15.

The main CPU 10 is also connected to an exposure control circuit 16 that drives and controls a shutter mechanism (not shown) and a diaphragm mechanism (not shown), etc., in accordance with the inputted photographing data. Additionally, the main CPU 10 is connected to a CCD processing circuit 18, which detects the state in which the photographing lens 2 is in focus in response to the data (focal point data) of an object to be taken outputted from an automatic focusing CCD object distance measuring sensor 17, an AF motor control circuit 20 which drives an AF motor 19 for carrying out the focusing of the photographing lens 2, and an AF pulser 21 which detects the angular displacement of the AF motor 19 to generate pulses corresponding to the angular displacement. The automatic focusing CCD object distance measuring sensor 17 outputs a predetermined focus data signal by receiving light of the object to be taken incident through the photographing lens 2.

The AF motor 19 transmits drive power to the photographing lens 2 through a coupler 19a provided on a body mount BM of the camera body so as to be extended from the camera body and coupler 31a provided on a lens mount LM of the photographing lens 2 when the connection between the couplers 19a and 31a is established.

A battery 22 powers not only electronic components and electronic circuits in the camera body 1, but also electronic components and electronic circuits in the photographing lens 2.

In the photographing lens 2 are provided a focusing mechanism 31 which rotates a focus adjusting cam ring (not shown) to move focusing lens groups of the lens 2 in the optical axis direction to thereby effect focusing, and a zooming mechanism 32 which rotates a zoom ring (not shown) to move at least two groups of variable power lenses of the lens 2 in the optical axis direction to effect zooming.

The focusing mechanism 31 is connected to the coupler 31a which is electrically connected to the coupler 19a when the photographing lens 2 is attached to the camera body 1 to transmit the rotational drive of the AF motor 19 to the focusing mechanism 31. The focusing mechanism 31 rotates the focus adjusting cam ring to effect focusing. The couplers 19a and 31a are disconnected by a disengaging means (not shown), so that a photographer can manually rotate a focus adjusting operation ring to adjust the focus in a manual focusing mode.

The zooming mechanism 32 is driven by a PZ (power zoom) motor 34 which is in turn driven and controlled by a power zoom motor driving portion 33. The operation of the PZ motor driving portion 33 is controlled in a power zoom mode by the lens CPU 30 or a power zoom switch SWPZ2 (FIG. 2), and is driven by the photographer in a manual zoom mode. The mode selection between the power zoom mode and the manual zoom mode is controlled by a zoom switch SWPZ1. Control is effected by a switching means.

To the input ports of the lens CPU 30 are connected data input means, such as a PZ pulser 35, a distance code plate 36, a zoom code plate 37 (distance code plate B), a zoom operation code plate 38, a lens judgment code 39, and a data setting portion 40.

The PZ pulser 35 detects the number of pulses representing the displacement of the PZ motor 34.

The distance code plate 36 reads position data of the focus adjusting cam ring (focusing lens groups) driven by the focusing mechanism 31. That is, it detects the divided focal length steps at a specific focal length.

The zoom code plate 37 reads positional data of the zooming cam ring (variable power lens groups) driven by the zooming mechanism 32. The zoom code plate 37 is connected to the distance code plate B when a macro lens is used and outputs a judgment signal which detects the divided object distance steps corresponding to the object distance data, i.e., an optional object distance of the macro lens.

The zoom operation code plate 38 inputs data of the direction and speed of the power zooming by the operation of the zoom operation switch.

The lens judgment code plate 39 determines the type of photographing lens 2 (i.e., new type or old type, or zoom lens, single focus lens, or single focus macro lens, etc.).

The setting portion 40 is made of a code plate and outputs data on a K value at a telephoto extremity and a K value at an infinite object distance of a single focus macro lens.

The drive pulse "K value" means a value used for the automatic focusing operation of the lenses which can be moved by the AF motor and is the number of pulses of the AF pulser 21 necessary for moving an image plane formed by the photographing lens 2 through a unit displacement (e.g., 1 mm).

The zoom code plate 37 and the other code plates, per se known, are usually made of code plates secured to a cam ring and brushes mounted to a stationary ring with a plurality of electrical contacts independently brought into sliding contact with the codes of the code plates. The positions of the cam rings are usually detected as bit information by a combination of the codes with which the electrical contacts of the brushes come into contact. The focal length is divided into a plurality of equidistant focal length steps.

A lens interface 41, together with the lens CPU 30, constitutes a microcomputer 61 of the lens and is connected to a data input terminal of the lens CPU 30. When the old communication (mentioned later) between the photographing lens and the camera body is carried out, the data communication between the lens CPU 30 and the indication CPU 11 is effected through the lens interface 41 to which a macro code portion 42 is connected to input macro data thereto at a macro mode.

The lens CPU 30 performs the arithmetic operation to obtain various data, such as current focal length, current object distance, etc. The minimum data necessary for the arithmetic operation is stored in an internal ROM (not shown) of the lens CPU 30.

Circuit of Camera Body

Figure 3:
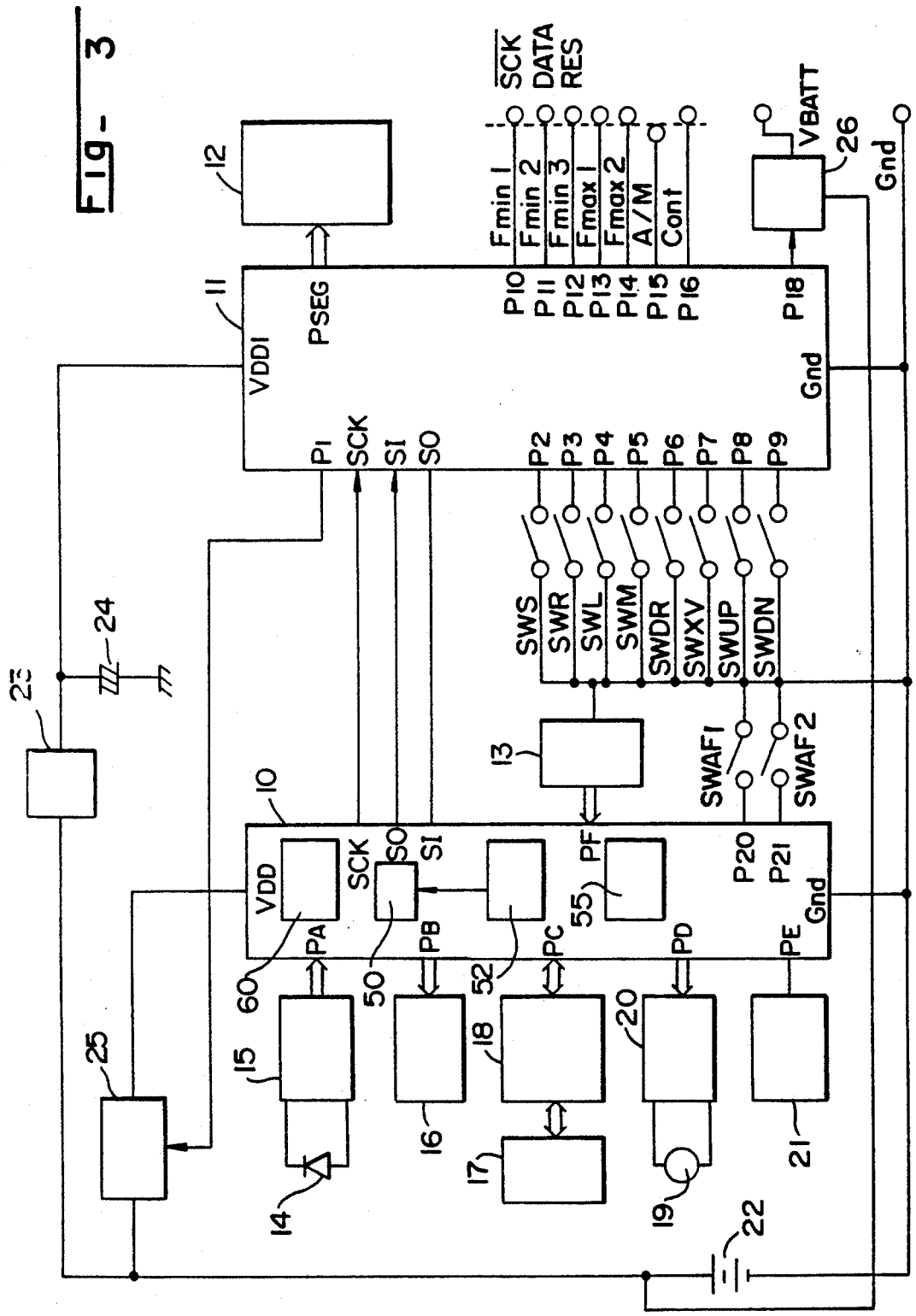
FIG. 3 is a block diagram of a main circuit arrangement of a camera body shown in FIG. 1.

The circuit arrangement of the camera body 1 will be described below in detail with reference to FIG. 3.

The voltage of the battery 22, which is controlled by a regulator 23 and which is backed up by a super capacitor 24, is supplied to terminal VDD1 of the indication CPU 11. The indication CPU 11 is always activated at a constant voltage input to the VDD1 terminal.

Terminals P1 and P2 of the indication CPU 11 are connected to a DC/DC converter 25, which turns the power source of the main CPU 10 ON and OFF when a photometer switch SWS is turned ON by depressing a shutter button (not shown) halfway. Terminal P3 of the indication CPU 11 is connected to a release switch SWR which is turned ON when the shutter button is fully depressed, which terminal P4 of the indication CPU 11 is connected to a lock switch SWL which is turned ON when the camera is brought into a suitable photographing position.

The DC/DC converter 25 is actuated when the lock switch SWL is turned ON and when the photometer switch SWS or the release switch SWR is turned ON, and in accordance with a command from the indication CPU 11 upon inputting the lens data from the photographing lens 2, to supply the VDD1 terminal of the main CPU 10 with a constant reference voltage to thereby actuate the main CPU 10.

Furthermore, terminals P5, P6, P7, P8 and P9 of the indication CPU 11 are connected to a mode switch SWM, a drive switch SWDR, an exposure correction switch SWXV, an up-switch SWUP and a down-switch SWDN, respectively.

The indication CPU 11 operates in accordance with the operative and inoperative states of these switches SWM, SWDR, SWXV, SWUP, and SWDN. For instance, the exposure modes include a programmed exposure mode, an automatic exposure mode, and a manual exposure mode which are selected in accordance with the operation of the mode switch SWM. Similarly, drive modes include a single shot mode and a continuous shot mode which are selected in accordance with the operation of the drive switch SWDR. The selection modes can be varied in accordance with the operation of an up-switch SWUP and a down-switch SWDN at the position in which the exposure modes or the drive modes can be selected.

The indication CPU 11 makes it possible to change the exposure value when the exposure switch SWXV is turned ON. Namely, the exposure value can be increased and decreased in accordance with the operation of the up-switch SWUP and the down-switch SWDN, respectively.

The indication CPU 11 has a group of indication control terminals PSEG connected to an indicating LCD 12 through a bus line. The indicating LCD 12 indicates necessary photographing data in accordance with a command of the indication CPU 11 when the lock switch SWL is turned ON.

Seven terminals, P10 through P16 of the indication CPU 11, are connected to electrical contacts Fmin1, Fmin2, Fmin3, Fmax1, Fmax2, A/M, and Cont provided on the body mount BM of the camera body, respectively. Terminal P18 of the indication CPU 11 is connected to a switch circuit 26.

Electrical contacts Fmin1, Fmin2 also and Fmin3 function as communication terminals for data communication between the photographing lens 2 and the indication CPU 11. Namely, electrical contacts Fmin1, Fmin2 and Fmin3 constitute a serial clock signal inputting and outputting terminal $\overline{SCK}$, a data transmitting and receiving terminal DATA, and a reset signal outputting terminal RES, respectively. Furthermore, the voltages of the terminals P10, P11 and P12 of the indication CPU 11 are always pulled up within the indication CPU 11.

The output of the switch circuit 26 is connected to terminal VBATT and functions as a switch for establishing and breaking the electrical connection between the battery 22 and the VBATT terminal in accordance with the level of terminal P18. The Gnd terminal of the indication CPU 11 is connected to the ground terminal Gnd of the battery 22.

The indication CPU 11 and the main CPU 10 communicate with each other through serial terminals SCK, serial-in terminals SI and serial-out terminals SO. In conventional data communication, data is transferred using command codes as shown in Table 1 below. In Table 1, the left column represents data which is outputted from the indication CPU 11 to the main CPU 10, and the right column represents the data which is transferred from the main CPU 10 to the indication CPU 11. This data is set based on the measurements of the object luminance and the object distance, etc. controlled by the main CPU 10.

TABLE 1

| Indication CPU → Main CPU | Main CPU → Indication CPU |
|---|---|
| Mode Setting Data | Indication Tv, Sv data |
| Drive Setting Data | Film Sensitivity Data |
| Exposure Correction | AF Accommodation |
| Setting Data | Pulse No. Data |
| Lens CPU Data | AF Return Completion Data |
| Setting TV, SV Data | |
| AF Accommodation Data | |
| AF Return Code | |
| AF Return Pulse No. Data | |
| AF Accommodation | |
| and Return Codes | |

Contact groups PA, PB, PC, PD, PE and PF of the main CPU 10 are connected to an A/D converter 15, the exposure control circuit 16, the CCD processing circuit 18, the AF motor control circuit 20, the AF pulser 21, and the DX code input circuit 13, respectively.

Terminal P20 of the main CPU 10 is connected to a first AF switch SWAF1, which selects an auto focus mode in which focusing is automatically effected by the AF motor 19 and a manual focus mode in which focusing is effected by a photographer. Terminal P21 of the main CPU 10 is connected to a second AF switch SWAF2, which switches the mode of the shutter release between a focus priority mode and a release priority mode. The first and second AF switches SWAF1 and SWAF2 are mechanically associated with each other, so that, for example, when the manual focus mode is selected by the first AF switch SWAF1, the second AF switch SWAF2 is switched to the release priority mode. Namely, when the first AF switch SWAF1 is turned ON, the second AF switch SWAF2 is turned OFF.

The main CPU 10 is provided with an AF control means 60, an F-number transmitting means 50, an F-number storing means 52, and a control prohibition means 55.

The AF control means 60 executes an auto-focusing control.

The F-number transmitting means 50 transmits the F-number (permission F-number) set in the camera body to the lens CPU 30, so as to effect the auto-focusing control in accordance with the AF control means 60.

The F-number storing means 52 stores the F-number which is to be transmitted by the F-number transmitting means 50.

The control prohibition means 55 prohibits the auto focus control by the AF control means 60 in accordance with the judgment data sent from the microcomputer of the photographing lens to determine whether auto focusing can be effected.

Circuit of Photographing Lens

Figure 2:
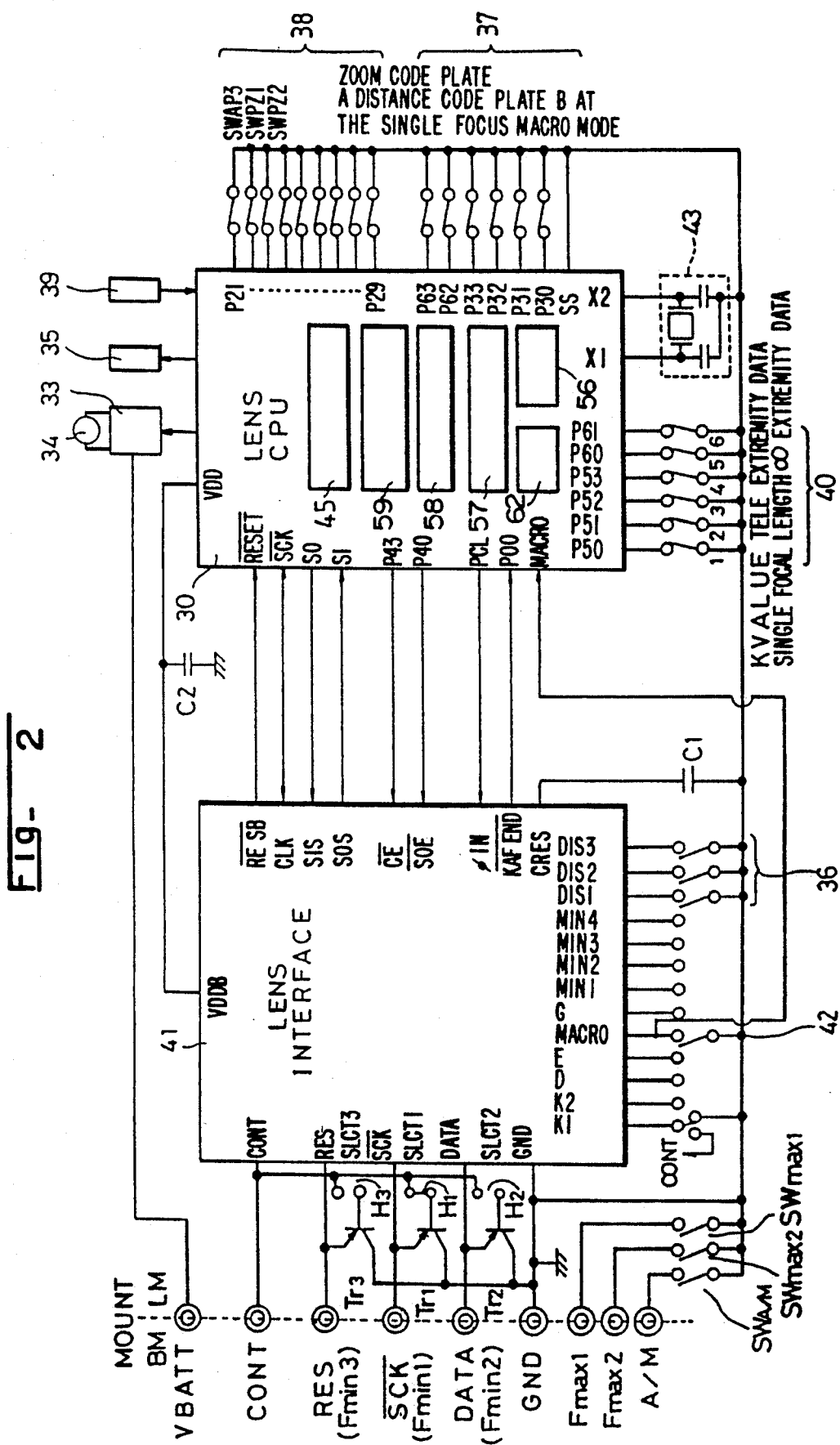
FIG. 2 is a block diagram of a main circuit arrangement of a photographing lens shown in FIG. 1.

The circuit arrangement of the electrical system provided in the photographing lens 2 will be explained below, with reference to FIG. 2.

The lens mount LM of the photographing lens 2 is provided with electrical contacts VBATT, CONT, RES (Fmin3), $\overline{SCK}$ (Fmin1), DATA (Fmin2), GND, Fmax1, Fmax2 and A/M, corresponding to the associated electrical contacts provided on the body mount BM when the photographing lens 2 is attached to the camera body 1. Although the arrangement of the electrical contacts of the lens mount LM is not identical to that of the body mount BM, for the purpose of clarification, the electrical contacts of the lens mount designated are electrically connected to the corresponding electrical contacts of the body mount with the same reference numerals.

The VBATT contact on the lens side is connected to the PZ driver 33, so that the power of the battery 22 is directly supplied to the PZ motor 34 through the VBATT contact by the switching operation of the PZ driver 33.

The Fmax1 and Fmax2 contacts of the lens side also function as a steady information transmitting means for transmitting the maximum F-number data of two bits to the camera body and are similar to those provided on a conventional AF lens. Namely, the Fmax1 and Fmax2 contacts on the lens side are grounded through switches SWmax1 and SWmax2, so that a maximum F-number (minimum diaphragm value) data is formed in accordance with a combination of the levels of the switches SWmax1 and SWmax2 depending on the ON/OFF states thereof. The combinations of the levels of the contacts Fmax1 and Fmax2 on the lens side and the maximum F-number are shown, by example, in Table 2 below:

TABLE 2

| F NO. | Fmax2 | Fmax1 |
| --- | --- | --- |
| 22 | 0 | 0 |
| 32 | 0 | 1 |
| 45 | 1 | 0 |

The A/M contact on the lens side has the function of sending the auto/manual information of the diaphragm to the camera body 1, and is grounded through a selection switch SWA/M. The selection switch SWA/M is in association with the rotation of a diaphragm ring (not shown) of the photographing lens 2, so that, when the diaphragm ring is in the auto position and the manual position, the selection switch is turned ON and OFF, respectively.

PNP transistors Tr (Tr1, Tr2 and Tr3) are connected at the emitters thereof to the lens contacts Fmin1, Fmin2 and Fmin3, and at the bases thereof to the contact CONT through fuse portions H1, H2 and H3 so as to establish and break the connection, respectively. The collectors of the transistors are grounded. It is possible to provide the fuse portions H1, H2 and H3 between the emitters and the lens contacts Fmin (Fmin1, Fmin2 and Fmin3).

Terminals CONT, RES, $\overline{SCK}$, DATA and GND of the lens interface 41 are connected to terminals CONT, Fmin3, Fmin1, Fmin2 and GND on the lens side, respectively.

The lens contact CONT is connected to the bases of the transistors Tr and to the CONT terminal of the lens interface 41, as mentioned above. The switching of the power supply from the CONT terminal of the lens interface is effected through the lens terminal Fmin3. After the data on the open F-number is transferred, when the CONT and RES (lens terminal Fmin3 terminals) become levels "H" and "L", respectively, power is supplied to the lens CPU 30.

Terminal VDDB of the lens interface 41 is connected to the VDD terminal of the lens CPU 30 through a capacitor C2, so that a constant voltage supplied from the terminal CONT of the camera body 1 is supplied to the lens CPU 30.

Terminals DIS1, DIS2 and DIS3 of the lens interface 41 are connected to the distance code plate 36, so that distance data signals of the object distance corresponding to the position of the focusing cam ring driven by the focusing mechanism 31 are inputted to the DIS1, DIS2 and DIS3 terminals.

Terminal MACRO of the lens interface 41 is connected to the macro code portion 42 which functions as a macro switch and is turned ON when the zoom operation ring is actuated to switch the photographing lens 2 to the macro mode.

The input and output terminals of the lens interface 41 are connected to the corresponding input and output terminals of the lens CPU 30. Reset terminal $\overline{RESB}$, clock terminal CLK, serial-in terminal SIS, serial-out terminal SOS, terminal $\overline{CE}$, terminal $\overline{SOE}$, terminal $\phi$ IN, and terminal $\overline{KAFEND}$, of the lens interface 41 are connected to reset terminal $\overline{RESET}$, serial clock terminal $\overline{SCK}$, serial-out terminal SO, serial-in terminal SI, terminal P43, terminal P40, terminal PCL, and terminal POO of the lens CPU 30, respectively. Terminal CRES of the lens interface 41 is grounded through a delay capacitor C1.

The lens CPU 30 controls the PZ driver 33 connected to the control terminal thereof. The lens CPU 30 is also connected to the PZ pulser 35 and the lens discriminating code 39 which outputs data regarding the kind of the lenses (old lens, new lens, etc.).

Terminals P30, P31, P32 and P33, and terminals P62 and P63 of the lens CPU 30, are connected to the codes of the zoom code plate 37. The zoom code plate 37 serves as a distance code plate B at the single focus macro mode. Terminals P21 through P29 are connected to various switches, including an automatic focusing switch SWAF3 and the power zoom switches SWPZ1 and SWPZ2, etc. Terminals P50 through P53, P60 and P61 of the lens CPU 30 are connected to the data setting portion 40.

The lens CPU 30 includes a lens judging means 45, an arithmetic operation means 56, a comparing means 57, a data storing means 62, a judgment data setting means 58, and a judgment transmitting means 59.

The lens judging means 45 determines whether the lens attached to the camera body is an old lens or a new lens, and the attached lens is a zoom lens, a single focus lens or a single focus macro lens, etc., in accordance with the data of the lens discriminating code 39. The phrase "old lens" means a lens having no CPU and the phrase "new lens" means a lens having a CPU.

The arithmetic operation mean 56 calculates the open F-number in accordance with data from the data storing means 62.

The data storing means 62 stores data, such as coefficient data necessary for calculating the open F-number at the respective focal lengths of the photographing lens 2 by the arithmetic operation means 56.

The comparing means 57 compares the permission F-number transmitted from the F-number transmitting means 50 with the calculated open F-number obtained by the arithmetic operation means 56.

The judgment data setting means 58 sets the judgment data which determines the possibility of auto focusing, in accordance with the results of the comparing means 57.

The judgment data is a flag data in the illustrated embodiment. Namely, when auto focusing can be effected, the flag is set to "1" and when auto focusing cannot be effected, the flag is set to "0".

The judgment transmitting means 59 transmits the AF judgment data, set by the judgment data setting means 58, to the main CPU 10.

The photographing lens 2 has a clock pulse generating circuit 43 which is connected to clock terminals X1 and X2 of the lens CPU 30. The lens CPU 30 operates synchronously with the clock pulses generated by the clock pulse generating circuit 43.

As mentioned above, on the camera body side, after the CONT terminal drops to the level "L" and open F-number is read, both the CONT and RES (Fmin3) terminals become level "H" to reset the lens CPU 30.

When the reset is released, the lens CPU 30 begins the old communication in accordance with the clock pulses of the camera body 1. This communication is carried out by hardware of the lens interface 41. In the illustrated embodiment, the data for 19 bytes is sent to the camera body 1.

Upon completion of the communication, terminal $\overline{KAFEND}$ of the lens interface 41 becomes level "L", which is a communication completion signal. Consequently, the lens CPU 30 waits for renewal data of the communication from the camera body 1.

When the lens CPU 30 receives the renewal communication data from the camera body 1, the DATA (Fmin2) terminal which has been at level "H" becomes level "L" and then returns to level "H", so that the camera body can commence the new communication. Note that the states of the CONT and RES terminals are held when the lens CPU 30 is first activated.

The new communication which commences upon completion of the old communication is carried out directly between the lens CPU 30, the indication CPU 11 and the main micro computer 10 without the lens interface 41. The data is transmitted from the lens CPU 30 to the main micro computer 10 and the indication CPU 11 or from the main micro computer 10 and the indication CPU 11 to the lens CPU 30, in accordance with the command code of the indication CPU 11. An example of the data communicating between the photographing lens 2 and the camera body 1 is shown in Table 3.

The new data communication is effected synchronously with the clock pulse outputted from the photographing lens 2.

TABLE 3

| Lens → Camera Body | |
| --- | --- |
| AF Data | 0011.0001 (31H) |
| AE Data | 0011.0010 (32H) |
| All Data | 0011.0011 (33H) |
| Every One Byte | 1010.XXXX (5XH) |
| Lens Data 1 | 0110.0000 (60H) |
| Lens Data 2 | 0110.0001 (61H) |
| Camera Body → Lens | |
| Focal Length Data fWide | 0110.0010 (62H) |
| Focal Length Data fTele | 0110.0011 (63H) |
| Focal Length Data fX(present) | 0110.0100 (64H) |
| Lens Drive Data | 0110.0110 (66H) |
| Lens Accommodation | 1001.0010 (90H) |
| Lens Return | 1001.0001 (91H) |
| PH ON | 1001.0010 (92H) |
| PH OFF | 1001.0011 (93H) |

| | Lens Data 1 60H | Lens Data 2 61H | Lens Drive Data 66H |
| --- | --- | --- | --- |
| Bit 7 | PH Demand | Lens CPU | fW extremity |
| Bit 6 | AF A/M | | fT extremity |
| Bit 5 | PZ A/M | Lens Internal PZ | |
| Bit 4 | PZ P/A | | |
| Bit 3 | PZ MODE | | PZ Far |
| Bit 2 | SET SW | | PZ Near |
| Bit 1 | Lens A/M | Lens | |
| Bit 0 | Lens O/C | Version | |

AF Judgment

The following discussion will be addressed to the calculation of the open F-number data for each focal length step of the photographing lens 2 by the arithmetic operation means 56.

Figure 4:
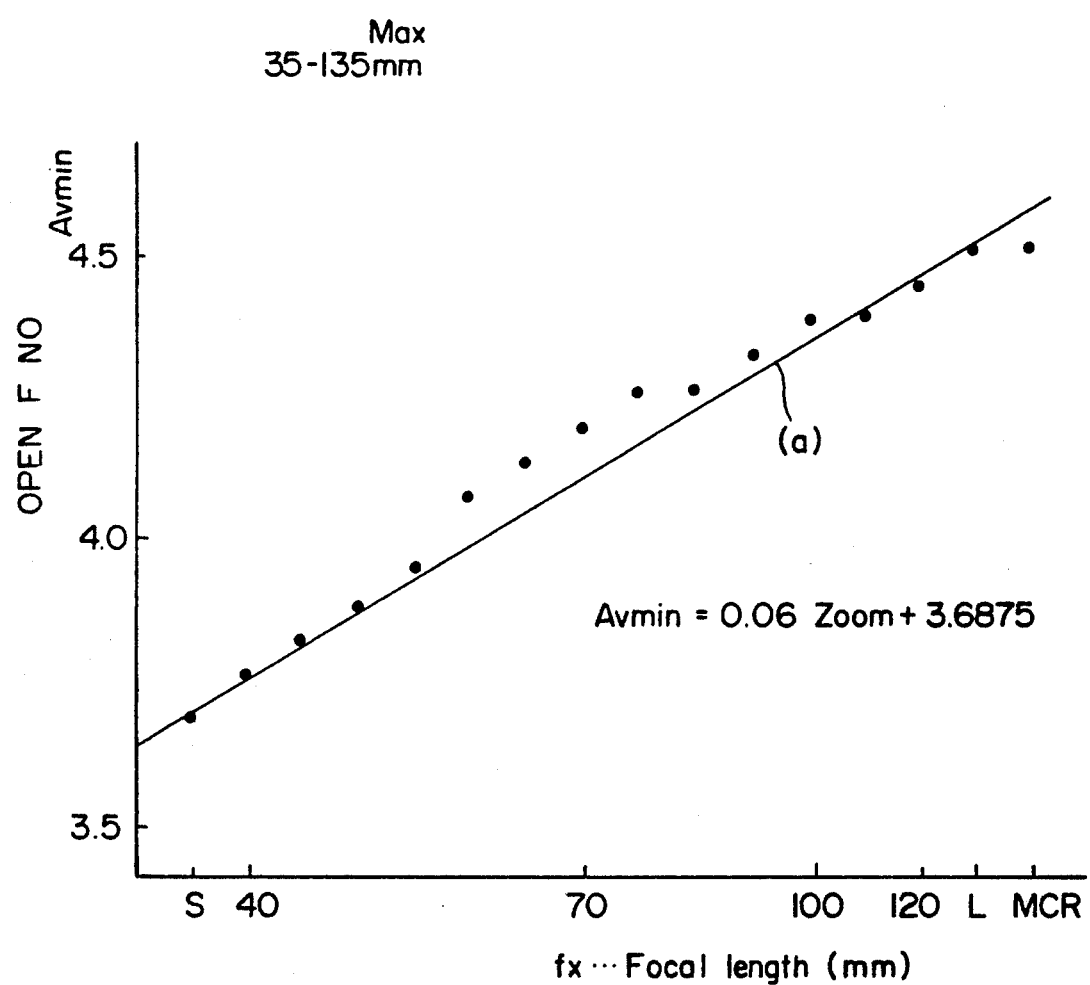
FIG. 4 is a diagram showing a relationship between a focal length and an open F-number; and, FIG. 5 is a flow chart of steps performed by an autofocus judgment.

FIG. 4 is a graph showing the relationship between the focal length and the open F-number of the zoom lens, in which the focal length varies in a range of 35 mm through 135 mm. The abscissa and the ordinate represent the focal length and the open F-number, respectively.

Straight line (a) is a linear function and intersects the ordinate at Avmin=3.6875. The graph shows that the focal length is substantially in linear proportion to the open F-number. Strictly speaking, although the open F-number is scattered in the vicinity of the line (a), the open F-number, at each focal length, is represented by an approximate value on line (a) which are adjusted.

Supposing that the gradient at a focal length is "$m_1$", line (a) is defined by the following equation:

$$Avmin = m_1 \cdot f_x + 3.6875 \quad (1)$$

Consequently, gradient "$m_1$" can be obtained by:

$$m_1 = (Avmin - 3.6875)/f_x \quad (2)$$

Gradient "$m_1$", which depends on the photographing lens, is prestored in the ROM (data storing means 62) of a new lens which is used in the new communication.

Since the value Av is small at the wide angle extremity mode and large at the telephotoextremity, minimum Av "Avmin" can be obtained by the following equation:

$$Avmin = AvminW + \Delta Avmin \cdot f_x \quad (3)$$

wherein AvminW is an F-number at the wide angle extremity (=3.6875) and $\Delta$ Avmin is a variation of the minimum Av, and $f_x$ is a focal length.

Similarly, a maximum Av "Avmax" can be obtained by the following equation:

$$Avmax = AvmaxW + \Delta Avmax \cdot f_x \quad (4)$$

wherein AvmaxW is the maximum Av at the wide angle extremity, and $\Delta$ Avmax is the variation of the maximum Av, and $f_x$ is the focal length.

Since "$\Delta$ Avmin" and "$\Delta$ Avmax" are equal to "$m_1$" and "$m_2$", respectively:

$$Avmin = AvminW + m_1 \cdot f_x \quad (5)$$

$$Avmax = AvmaxW + m_2 \cdot f_x \quad (6)$$

Gradients "$m_1$" and "$m_2$" and the minimum and maximum Av values are stored as data peculiar to the photographing lens in the data storing means 62. The stored data can be read from the data storing means 62 by designating the associated addresses when the open F-number is calculated by the arithmetic operation means 56, in accordance with equations (5) and (6) mentioned above.

The data thus calculated by the arithmetic operation means 56 is sent to the comparing means 57 in the lens CPU.

The permission and prohibition of the auto focus control are carried out as follows (see FIG. 5).

The F-number transmitting means 50 reads the permission F-number, which permits the AF control means 60 to carry out the auto focus control, from the F-number storing means 52 and transmits it to the microcomputer 61 of the photographing lens. The permission F-number is supplied to the comparing means 57 (step S1).

The arithmetic operation means 56 calculates the open F-number in accordance with the above mentioned equations. If the photographing lens 2 is a zoom lens, the arithmetic operation means 56 calculates the open F-number at the present focal length step. Thus, the calculated open F-number is sent to the comparing means 57 (step S2).

The comparing means compares the permission F-number with the calculated open F-number at step S3.

If the permission F-number is larger than or equal to the open F-number, the judgment data setting means 58 sets the AF judgment flag (flag data to) "1", which means that the auto focus control is permitted (step S4).

The flag data is then sent to the camera body 1 by the judgment data transmitting means 59 at step S5. As a result, the AF judgment flag data is sent to the main CPU 10 so that the auto focus control can be effected by the AF control means 60.

In the prior art, the AF judgment flag data must be stored in the lens ROM, resulting in a decrease in memory area thereof. However, in the present invention, the AF judgment flag data is set in accordance with the detection result of the comparing means 57 every time the calculation is performed. Accordingly, the memory area of the lens ROM can be effectively increased.

If the open F-number is larger than the permission F-number at step S3, the judgment data setting means 58 sets the AF judgment flag (flag data to) "0" (step S6).

Thereafter, flag data "0" is sent to the camera body 1 (step S5). As a result, the flag data is supplied to the main CPU 10 so that the control prohibition means 55 prohibits the auto focus control by the AF control means 60.

Therefore, even if a different photographing lens with a different brightness is attached to the camera body 1, the lens CPU thereof calculates the open F-number so that the comparing means 55 compares the calculated open F-number with the permission F-number of the camera body side to set the judgment flag to "1" or "0". Thus, a quick operation can also be expected when a photographing lens of a different brightness is attached to the camera body.

If the photographing lens is a zoom lens, the open F-number which varies during zooming is calculated in real time and compared with the permission F-number of the camera body side. Therefore, even a photographing lens in which all the focal lengths do not always correspond to the permission F-number of the camera body side can be used within a limited area in which the auto focus control can be carried out.

As can be understood from the foregoing, according to the present invention, the load on the microcomputer of the camera body can be decreased. Furthermore, since the judgment data setting means can set the judgment data in accordance with the detection result of the comparing means, it is not necessary to always store the judgment data, for example, the flag data in the lens ROM so that the memory area of the ROM can be effectively increased.

Although the invention has been described with reference to particular means, materials and embodiments, it is to be understood that the invention is not limited to the particulars disclosed, but extends to all equivalents within the scope of the claims.

We claim:

1. A camera system, comprising a camera body having a body microcomputer, and an interchangeable photographing lens having a lens microcomputer that is connectable to the body microcomputer to effect a data communication therebetween;

wherein said body microcomputer comprises AF control means for performing an auto focus control, and F-number transmitting means for transmitting a permission F-number set in said camera body to said lens microcomputer so as to effect said auto focus control in accordance with said AF control means; and, wherein said lens microcomputer comprises arithmetic operation means for calculating an open F-number at an optional focal length, comparing means for comparing said permission F-number transmitted by said F-number transmitting means with said open F-number calculated by said arithmetic operation means, and judgment data setting means for setting AF judgment data which determines a permission of said auto focus control in accordance with the result of detection of said comparing means.

2. A camera system according to claim 1, wherein said AF judgment data set by said judgment data setting means comprises flag data which is set to "1" when auto focusing can be effected and set to "0" when said auto focusing cannot be effected, in accordance with the result of detection of said comparing means.

3. A camera system according to claim 1, wherein said lens microcomputer further comprises judgment data transmitting means for transmitting said AF judgment data set by said AF judgment data setting means to said body for microcomputer.

4. A camera system according to claim 1, wherein said body microcomputer further comprises control prohibition means for prohibiting said auto focus control by said AF control means in accordance with said AF judgment data transmitted by said lens microcomputer.

5. A camera system according to claim 1, wherein said body microcomputer further comprises an indication CPU and a main CPU.

6. A camera system according to claim 1, wherein said lens microcomputer further comprises a lens CPU and a lens interface.

7. A camera body comprising a camera body having a body microcomputer, and an interchangeable photographing lens having a lens microcomputer which is connectable to said body microcomputer to effect a data communication therebetween;

wherein said body microcomputer comprises AF control means for performing an auto focus control, and F-number transmitting means for transmitting a permission F-number set in said camera body to said lens microcomputer so as to effect said auto focus control in accordance with said AF control means; and, wherein said lens microcomputer comprises arithmetic operation means for calculating an open F-number at an optional focal length, comparing means for comparing said permission F-number transmitted by said F-number transmitting means with said open F-number calculated by said arithmetic operation means, judgment data setting means for setting an AF judgment data which determines said permission of said auto focus control in accordance with the result of detection of said comparing means, and judgment transmitting means for transmitting said AF judgment data set by said judgment data setting means to said body microcomputer.

8. A camera system according to claim 7, wherein said AF judgment data set by said judgment data setting means comprises flag data which is set to "1" when auto focusing can be effected, and set to "0" when no auto focusing can be effected in accordance with the result of detection of said comparing means.

9. A camera system according to claim 7, wherein said body microcomputer further comprises control prohibition means for prohibiting said auto focus control by said AF control means in accordance with said AF judgment data transmitted by said lens microcomputer.

10. A camera system according to claim 7, wherein said body microcomputer further comprises an indication CPU and a main CPU.

11. A camera system according to claim 7, wherein said lens microcomputer further comprises a lens CPU and a lens interface.

* * * * *